United States Patent [19]

Turgeon

[11] Patent Number: 5,034,842
[45] Date of Patent: Jul. 23, 1991

[54] CARRIER WITH THUMB WIND ADVANCE FOR VIDEOCASSETTE

[75] Inventor: Thomas A. Turgeon, Fridley, Minn.

[73] Assignee: Minnesota Mining and Manufacturing Company, St. Paul, Minn.

[21] Appl. No.: 398,068

[22] Filed: Aug. 24, 1989

[51] Int. Cl.$^5$ .............................................. G11B 23/02
[52] U.S. Cl. ........................................ 360/132; 292/195
[58] Field of Search ................. 360/132, 128, 94, 95; 242/195, 198; 352/72, 78 R, 158

[56] References Cited

U.S. PATENT DOCUMENTS

| Re. 30,232 | 3/1980 | Wright . | |
|---|---|---|---|
| 2,148,756 | 2/1939 | Keys | 242/55 |
| 2,275,497 | 3/1942 | Berndt . | |
| 3,066,880 | 9/1959 | Bauer | 242/55 |
| 3,104,843 | 9/1963 | Missriegler | 242/55 |
| 3,105,645 | 10/1963 | Rost | 242/55 |
| 3,150,840 | 9/1964 | Briskin et al. | 242/55 |
| 3,188,091 | 6/1965 | Goodell | 274/11 |
| 3,197,150 | 7/1965 | Camras | 242/55 |
| 3,227,387 | 1/1966 | Laa et al. | 242/55 |
| 3,559,918 | 2/1971 | Braun | 242/198 |
| 3,672,603 | 6/1972 | Swain | 242/194 |
| 3,783,200 | 1/1974 | Jantzen et al. | 179/100 |
| 3,882,542 | 5/1975 | Nakamichi | 360/96 |
| 3,900,171 | 8/1975 | Serizawa | 242/198 |
| 3,913,145 | 10/1975 | Wiig | 360/132 |
| 3,941,333 | 2/1986 | Carpenter et al. | 242/197 |
| 4,091,426 | 5/1978 | Umeda | 360/74 |
| 4,173,319 | 11/1979 | Umeda | 242/199 |
| 4,183,477 | 1/1980 | Iwase et al. | 242/198 |
| 4,185,307 | 1/1980 | Sato | 360/94 |
| 4,196,873 | 4/1980 | Kudoh | 242/195 |
| 4,206,487 | 6/1980 | Sato | 360/94 |
| 4,232,840 | 11/1980 | Sugawara | 242/198 |
| 4,288,048 | 9/1981 | Sieben | 242/198 |
| 4,309,002 | 1/1982 | Saitou et al. | 242/198 |
| 4,341,365 | 7/1982 | Oishi | 242/199 |
| 4,358,070 | 11/1982 | Okamura et al. | 242/197 |
| 4,368,860 | 1/1983 | Goto | 242/199 |
| 4,426,047 | 1/1984 | Richard et al. | 242/197 |
| 4,449,676 | 5/1984 | Ogata et al. | 242/198 |
| 4,452,406 | 6/1984 | Richard | 242/195 |
| 4,452,407 | 6/1984 | Ogata et al. | 242/198 |
| 4,469,292 | 9/1984 | Mangold | 242/199 |
| 4,470,560 | 9/1984 | Yoneya et al. | 242/198 |
| 4,476,505 | 10/1984 | Ogata et al. | 360/94 |
| 4,477,850 | 10/1984 | Ogata et al. | 360/94 |
| 4,536,810 | 8/1985 | Umeda | 360/94 |
| 4,555,077 | 11/1985 | Platter et al. | 242/198 |
| 4,559,574 | 12/1985 | Umeda | 360/132 |
| 4,566,048 | 1/1986 | Tokunaga et al. | 360/94 |
| 4,567,536 | 1/1986 | Tsuchiya | 360/94 |
| 4,572,460 | 2/1986 | Hertrich | 242/195 |
| 4,622,605 | 11/1986 | Tsuruoka et al. | 360/94 |

*Primary Examiner*—A. J. Heinz
*Attorney, Agent, or Firm*—Merchant, Gould, Smith, Edell, Welter and Schmidt

[57] ABSTRACT

A carrier for use with a magnetic tape cartridge is disclosed. The carrier includes a manual advance mechanism to advance the tape media onto the take-up reel located within the tape carrier.

6 Claims, 4 Drawing Sheets

CARRIER WITH THUMB WIND ADVANCE FOR VIDEOCASSETTE

The present invention relates to magnetic tape cartridges and carriers for use in videotape machines. The tape cartridge is inserted into a carrier which adapts the cartridge to a standard videocassette format.

Most home videotape machines use magnetic recording media supplied in the VHS videocassette format. The typical videocassette has a housing containing both a supply reel and a take-up reel. The magnetic tape is attached to the hubs of the two reels. The housing has several guide posts which cooperate to define the tape path for the videocassette. The tape path is protected by a door which is closed when the videocassette is outside of the machine. When the videocassette is inserted into the machine the tape transport mechanisms open the door to permit the magnetic media to engage the rotating heads of the machine.

Although the traditional VHS format is popular it is not an efficient format for the storage of tape. The videocassette format includes an empty take up reel within the housing which reduces the density of information storage.

The present invention addresses this problem with a single reel tape cartridge which does not include an empty reel. This cartridge may be inserted into a cooperating carrier. The carrier accepts the cartridge and adapts the cartridge to the video cassette format.

The present invention addresses several problems related to the use of a cartridge and carrier to form a two piece videocassette.

SUMMARY OF THE INVENTION

The present invention discloses a specialized winding mechanism, which is incorporated into the carrier portion of the two piece videocassette. This winding mechanism is used to couple the tape on the supply reel to the take-up reel.

The tape cartridge includes a supply of tape which terminates in a tape connector. This tape connector is coupled to a tether connector located within the carrier. The tether connector is connected to a leader or tether which is connected to the take-up reel located in the carrier. The insertion of the cartridge into the carrier completes the tape-tether interconnection. Once the cartridge is fully inserted into the carrier the operator will manually advance the interconnection to the take up reel to prepare the carrier for insertion into the videocassette machine. This operation is performed by the specialized winging mechanism.

The winding mechanism is manually operated through a thumb key or tab. The thumb key is attached to a gear train which rotable a clapper gear into engagement with the gear teeth on the flange either the take up reel or the supply reel, depending on the direction of key rotation. By turning the thumb key, the tape-tether interconnection may be move from one side of the carrier to the other. Once the tape-tether interconnection is advanced onto the take up reel the videocassette may be safely inserted into the videocassette machine.

BRIEF DESCRIPTION OF THE DRAWING

In the drawing, in which like reference numerals indicate corresponding structures throughout the views.

DETAILED DESCRIPTION OF THE PREFERRED EMBODIMENT

In the following detailed description of the preferred embodiment, reference is made to an illustrative embodiment of the invention. It is to be understood that other embodiments may be utilized without departing from the scope of the present invention.

Pending U.S. patent application Ser. No. 07/343,851 filed 04/26/89 and pending U.S. patent application Ser. No. 07/353,826 filed May 18, 1989 relate to the tape cartridge and carrier technology described herein. Each of these applications is incorporated by reference.

Figure 1:
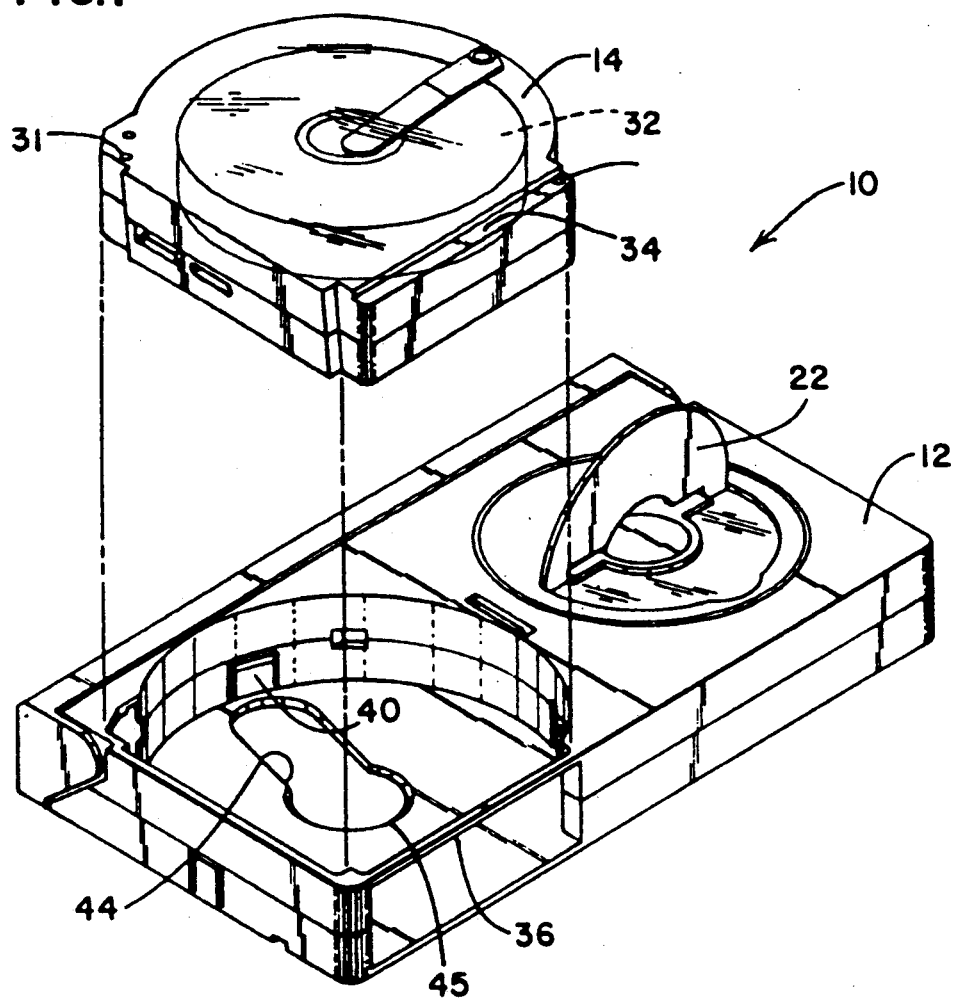
FIG. 1 is a perspective view of the carrier and the cartridge.

FIG. 1 depicts a cartridge 14 for insertion into a carrier 12. The insertion sequence begins by engaging ledge 34 of the cartridge with the cross support 36 of the carrier. Next, the cartridge is rotated into the home position depicted in FIG. 2. This insertion process causes a tape connector associated with the cartridge to engage a tether connector associated with a take-up reel. This tape-tether interconnection is show in phantom view as 16 in FIG. 3A and FIG. 3B. The interconnection sequence and related mechanisms are more fully described in commonly assigned, incorporated references.

Figure 2:
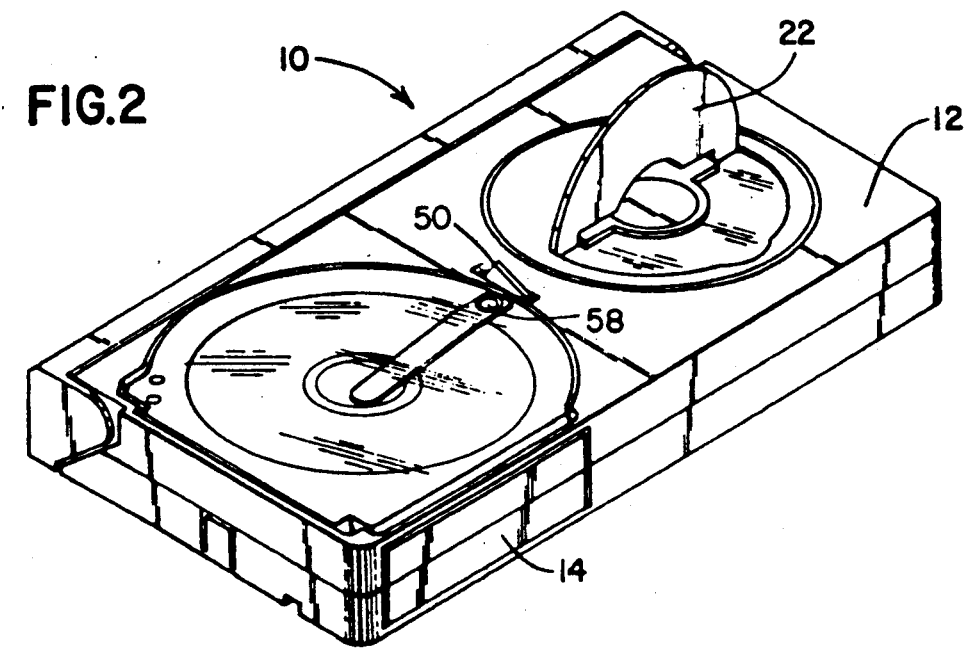
FIG. 2 is a perspective view of the cartridge inserted into the carrier.

A manually operated mechanism is provided in the carrier to advance the tape-tether interconnection 16 from the "home position" (FIG. 3A) on the supply reel side of the carrier to the "play position" (FIG.3B) on the take-up reel side of the carrier. It is preferred to operate this mechanism through a collapsible thumb key or tab 22. In FIG. 1 the key is shown in the collapsed position while FIG. 2 depicts the key in the operating position. In operation, the user will insert the cartridge into the carrier and then operate the thumb key to advance the interconnection 16 from the supply reel side to the take-up reel side of the carrier. Once the interconnection is on the take-up reel, the cartridge-carrier assembly may be introduced into the videocassette machine.

To remove the cartridge, the cartridge-carrier assembly 10 is removed from the videocassette machine at the end of the rewind cycle. The rewind cycle leaves the interconnection on the take-up side of the carrier in the "play position". The user then elevates the thumb key 22 and rewinds the tape-tether interconnection 16 to the "home position" depicted in FIG. 3A. Once the interconnection is in the home position, thumb pressure through the aperture 45 will permit the user to rotate the cartridge out of the carrier.

Figure 3A:
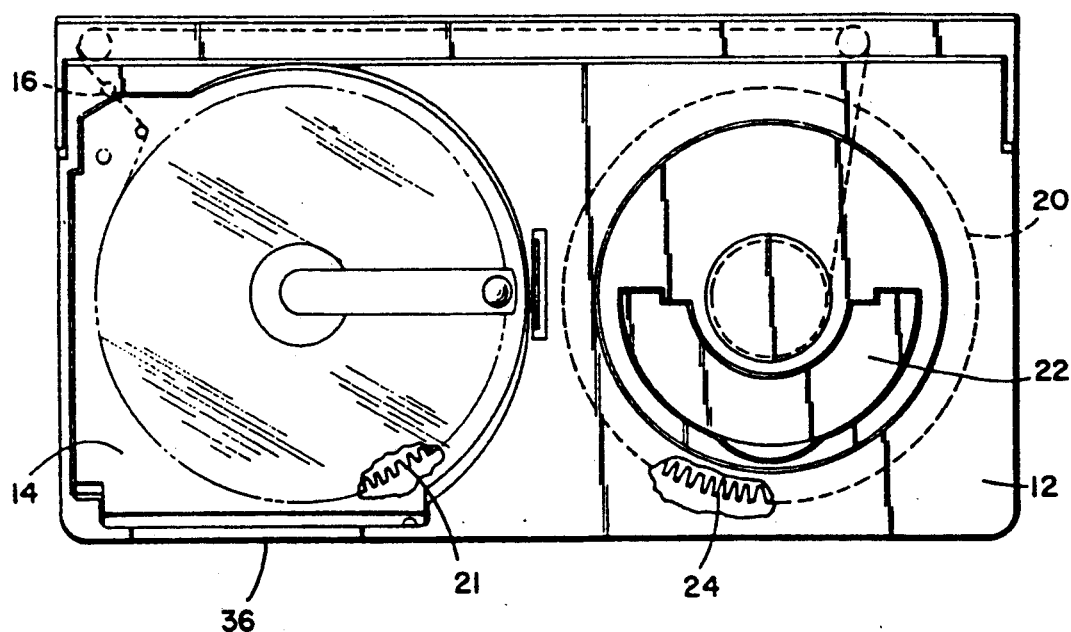
FIG. 3A is a top view of assembly with the tape-tether interconnection located near the supply reel.
Figure 3B:
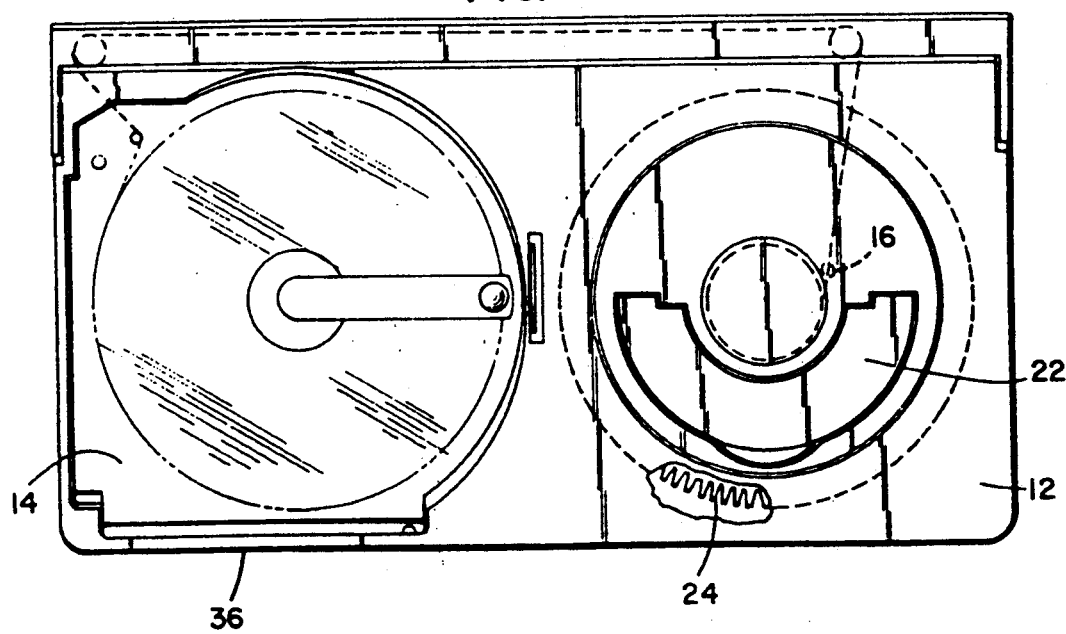
FIG. 3B is a top view of the assembly with the tape-tether interconnection advanced to the take-up reel.
Figure 4A:
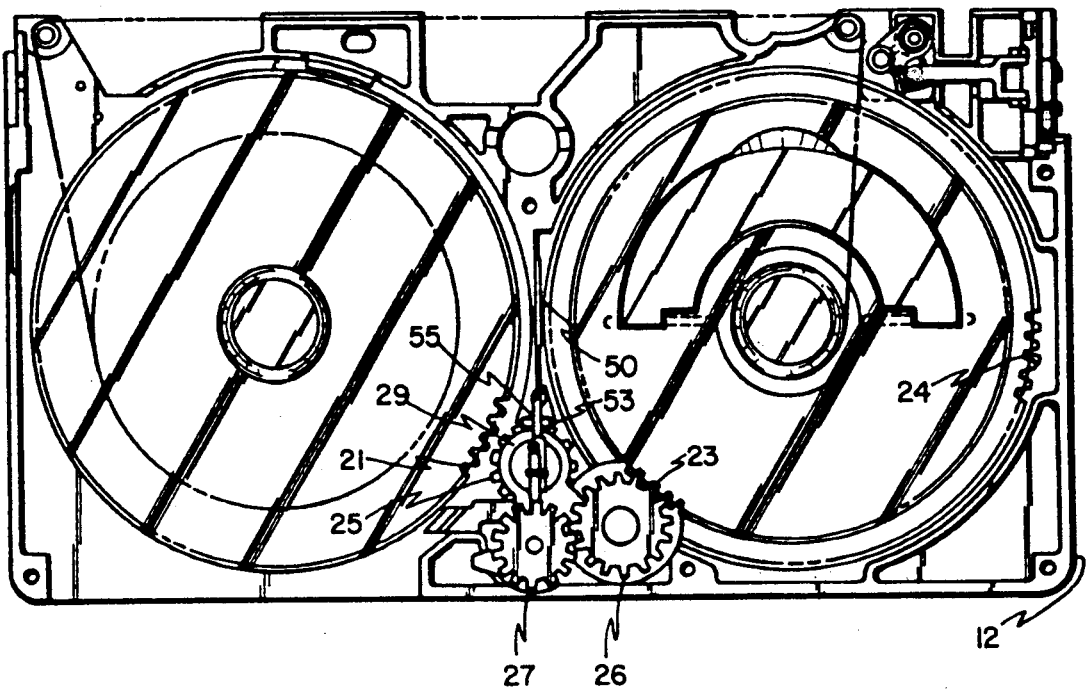
FIG. 4A is a top view of the carrier.
Figure 4B:
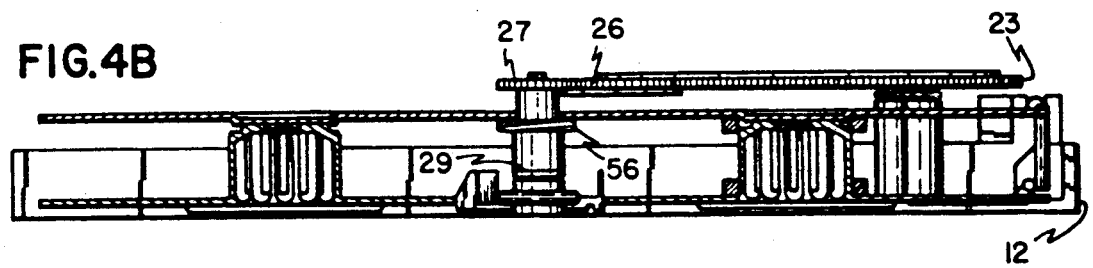
FIG. 4B is a side elevation of the carrier.

The thumb key 22 can apply torque to either the supply reel 19 or the take up reel 20. As shown in FIG. 3A and FIG. 4A the lower flange of the supply reel is a gear 21 while the lower flange of the take-up reel 20 is a gear 24. The rotable clapper gear 25 engages either the supply gear 21 or the take-up gear 24 depending on the direction of thumb key rotation. Power from the thumb key is transmitted through a gear train which includes a thumb key ring gear 23. The ring gear engages an idle gear 26 shown in FIG. 4A and 4B, which insures that clockwise rotation of the key advances the interconnection toward the take-up reel and that counterclockwise rotation of the key rewinds the interconnector toward the home position. Power from the idler gear is transmitted to a pair of transfer gears 27 and 28. The upper transfer gear 27 engages the idle gear 26. This transfer gear 27 is attached the lower transfer gear 28 through a mating D shaft spline.

The clapper gear 25 is mounted on an arm 29 which may pivot around the axis of the transfer gear assembly. This arm limits the rotational movement of the clapper gear (25) so as to limit tooth engagement and load. Rotation about this pivot will cause the clapper gear to engage either the supply gear 21 or the take up gear 24. A small amount of drag between the transfer gear assembly and the arm is required to apply torque to the arm 29 to cause it to rotate. This torque may be supplied by a wave washer 30 placed between the lower edge of the upper transfer gear and the arm.

Figure 4C:
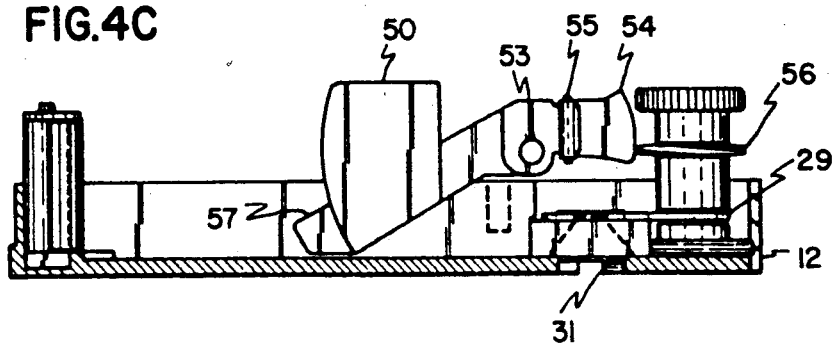
FIG. 4C is a side elevation of the carrier.
Figure 5:
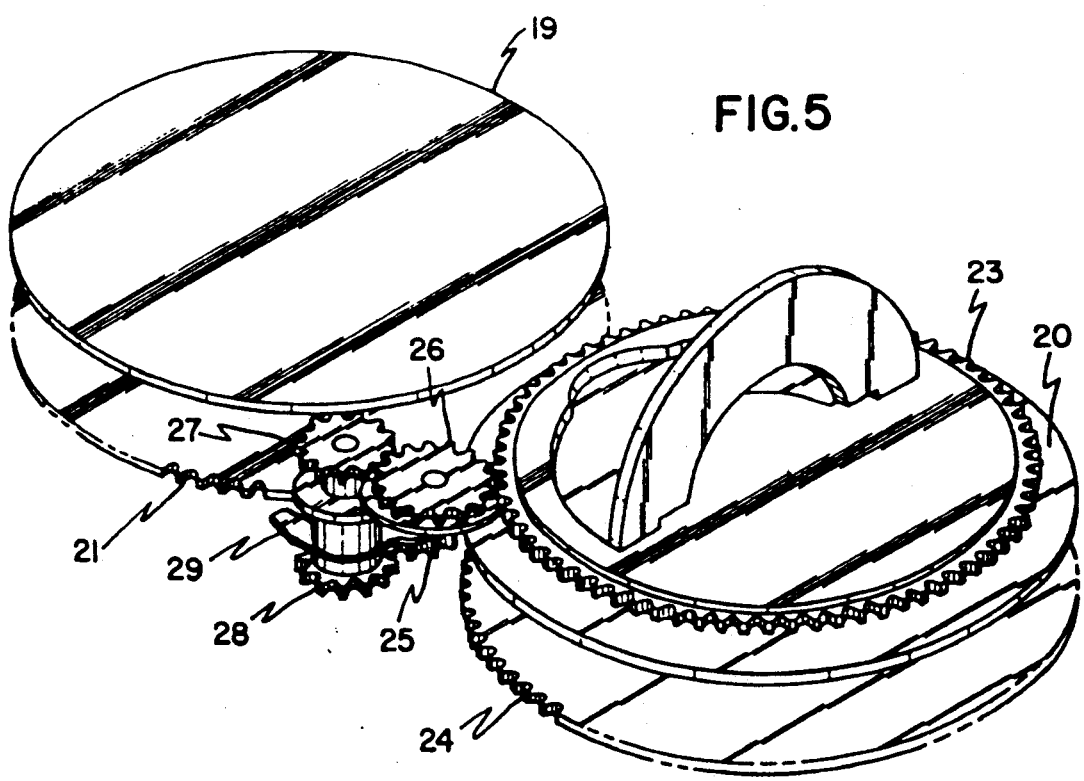
FIG. 5 is a perspective view of the carrier gear train.

In operation the user may advance or rewind tape through the key activated clapper gear. However once the carrier has been inserted into the videotape machine the tape transport will insert a pin into the aperture 31 formed in the carrier as seen in FIG. 4C. The pin, which is not shown, contacts the conical interior surface of the clapper gear 25 and disengages it from the gear teeth associated with the gear flanges.

This illustrative embodiment provides a convenient and effective method of preparing the carrier for insertion into a videocassette machine.

What is claimed is:

1. A carrier, for use with a tape cartridge, said cartridge of the type having a supply reel, said supply reel having a drive flange, said drive flange having gear teeth located on the periplay of said flange, said teeth adapted to rotate said supply reel, comprising:
    a housing adapted to receive said tape cartridge;
    a take-up reel located in said housing, adapted for rotation within said housing, said take-up reel having a drive flange, said drive flange having gear teeth, located on the periphery of said flange, for rotating said take-up reel;
    a drive gear ring located in said housing adapted for manual actuation;
    a rotable gear mounted on an idler arm, said idler arm mounted for rotation about an arm pivot, said pivot attached to said housing; said idler arm and rotable gear forming a clapper gear means;
    transfer gear means, concentric with said arm pivot, connected to said drive gear ring for coupling torque from said drive gear to said clapper gear means, and for transferring torque to said idler arm, whereby said clapper gear means is rotated into engagement with one of said gear flanges by the rotation of said drive ring.

2. The carrier of claim 1 wherein said drive means comprises:
    a winding tab, located in said housing, by manual actuation;
    a drive gear coupled to said winding tab whereby manual actuation of said winding tab causes rotation of said drive gear.

3. The carrier of claim 2 wherein said drive means further comprises:
    an idler gear mounted in said housing and coupled to said drive gear and coupled to said transfer gear, whereby power is transferred from said drive gear to said transfer gear.

4. The carrier of claim 1 wherein said clapper gear means comprises:
    an idler arm mounted for pivotal motion about a point concentric with the center of said transfer gear means;
    a rotable gear mounted for rotation about a point located on said idler arm, said rotable gear engaged with said transfer gear;
    drag means for transferring torque from said transfer gear to said idler arm, whereby rotation of said transfer gear causes said clapper gear means to rotate into engagement with said gear flange.

5. The carrier of claim 4 wherein said drag means comprises:
    a wave washer located between said transfer gear and said idler arm.

6. The carrier of claim 4 wherein said idler arm includes limit means for controlling the extent of idler arm travel.

* * * * *

UNITED STATES PATENT AND TRADEMARK OFFICE
CERTIFICATE OF CORRECTION

PATENT NO. : 5,034,842

DATED : July 23, 1991

INVENTOR(S) : Turgeon

It is certified that error appears in the above-identified patent and that said Letters Patent is hereby corrected as shown below:

Col. 1, line 20, inert --,-- after the word "popular".
Col. 1, line 22, "take up" should read --take-up--.
Col. 1, lines 27 & 28, "cooperating" should read --co-operating--.
Col. 1, line 29, "video cassette" should read --videocassette--.
Col. 1, line 43, insert --,-- after the word "tether".
Col. 1, lines 48 & 49, "take up" should read --take-up--.
Col. 1, line 54, "rotable a clapper" should read --rotates a rotable clapper--.
Col. 1, line 55, insert --of-- after the word "flange".
Col. 1, line 55, "take up" should read --take-up--.
Col. 1, line 58, "move" should read --moved--.
Col. 1, line 60, "take up" should read --take-up--.
Col. 2, line 31, "show" should read --shown--
Col. 2, line 62, "take-up" should read --take-up--.
Col. 3, line 9, insert --to-- after the word "attached".
Col. 3, line 17, "take up" should read --take-up--.
Col. 3, line 39, in claim 1, "periplay" should read --periphery--.

Signed and Sealed this

Twenty-third Day of February, 1993

Attest:

STEPHEN G. KUNIN

Attesting Officer

Acting Commissioner of Patents and Trademarks